United States Patent
Hwang et al.

(10) Patent No.: US 7,450,814 B2
(45) Date of Patent: Nov. 11, 2008

(54) OPTICAL DEVICE FOR A DISPLAY HAVING TAPERED WAVEGUIDE AND PROCESS FOR MAKING THE SAME

(75) Inventors: Gyuhwan Hwang, Gyeonggi-do (KR); Youngbin Yu, Seoul (KR); Hyunsoo Lee, Seoul (KR)

(73) Assignee: Sekonix Co., Ltd, Gyeonggi-Do (KR)

( * ) Notice: Subject to any disclaimer, the term of this patent is extended or adjusted under 35 U.S.C. 154(b) by 49 days.

(21) Appl. No.: 11/568,855

(22) PCT Filed: Feb. 16, 2005

(86) PCT No.: PCT/KR2005/000420

§ 371 (c)(1),
(2), (4) Date: Nov. 9, 2006

(87) PCT Pub. No.: WO2005/116740

PCT Pub. Date: Dec. 8, 2005

(65) Prior Publication Data

US 2007/0223867 A1    Sep. 27, 2007

(30) Foreign Application Priority Data

| May 31, 2004 | (KR) | 10-2004-0039312 |
| May 31, 2004 | (KR) | 10-2004-0039318 |
| May 31, 2004 | (KR) | 10-2004-0039319 |
| May 31, 2004 | (KR) | 10-2004-0039321 |

(51) Int. Cl.
   *G02B 6/02*    (2006.01)
   *B05D 5/06*    (2006.01)

(52) U.S. Cl. ................. 385/146; 385/123; 427/162

(58) Field of Classification Search ............ None
   See application file for complete search history.

(56) References Cited

U.S. PATENT DOCUMENTS

| 3,279,314 | A | 10/1966 | Miller |
| 5,462,700 | A | 10/1995 | Beeson et al. |
| 5,481,385 | A | 1/1996 | Zimmerman et al. |
| 6,417,966 | B1 | 7/2002 | Moshrefzadeh et al. |
| 6,538,813 | B1 | 3/2003 | Magno et al. |
| 7,057,810 | B2 * | 6/2006 | Thomas et al. ............ 359/443 |
| 2002/0080484 | A1 | 6/2002 | Moshrefzadeh et al. |

FOREIGN PATENT DOCUMENTS

| KR | 2003062450 | 7/2003 |
| WO | 1996021884 | 7/1996 |

* cited by examiner

*Primary Examiner*—Tina M Wong
(74) *Attorney, Agent, or Firm*—Mark M. Friedman

(57) ABSTRACT

Disclosed is an optical device for a display having a tapered waveguide and a method of fabricating such devices. In order to reduce light absorption inside the waveguide, a light-absorbing material is coated on the front surface only of the optical device Alternatively, a space adjacent to the waveguide is coated with a material having a refraction index different from the waveguide, preferably, lower than that of the waveguide and then filled with a light-absorbing material. In addition, a large- and uniform-sized light-absorbing material may be filled in the space. The optical device has an improved light efficiency, and thus exhibits an excellent luminance, as compared with the conventional ones, when using an identical light source. Furthermore, the fabrication method can produce such optical devices in a simplified manner, thus improving production efficiency.

18 Claims, 10 Drawing Sheets

[Fig. 1] (PRIOR ART)
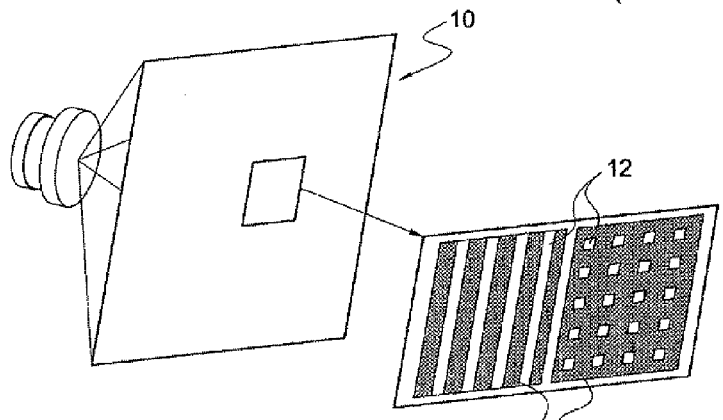
[Fig. 2] (PRIOR ART)
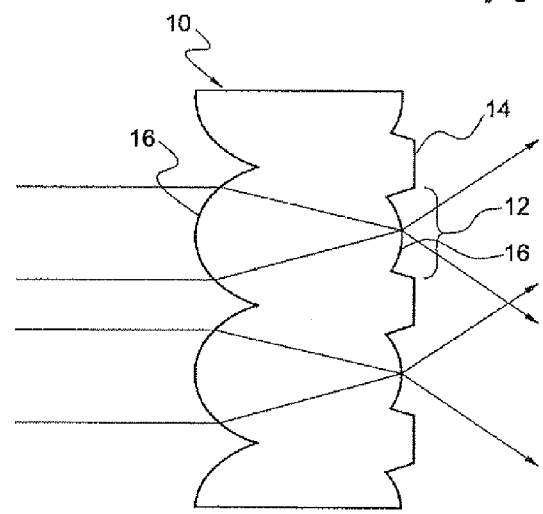
[Fig. 3] (PRIOR ART)
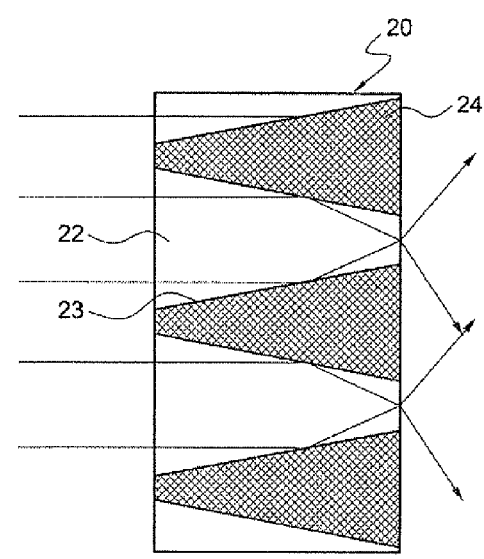

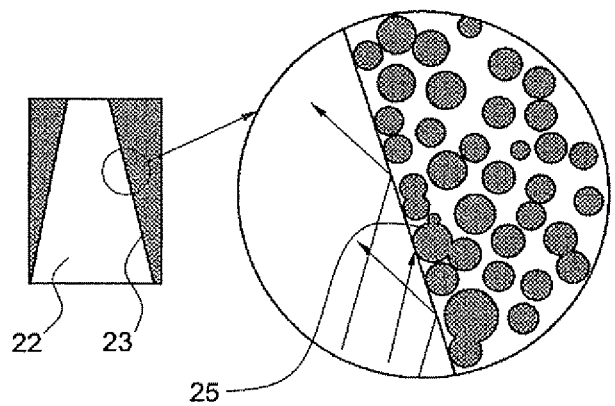
[Fig. 4] (PRIOR ART)
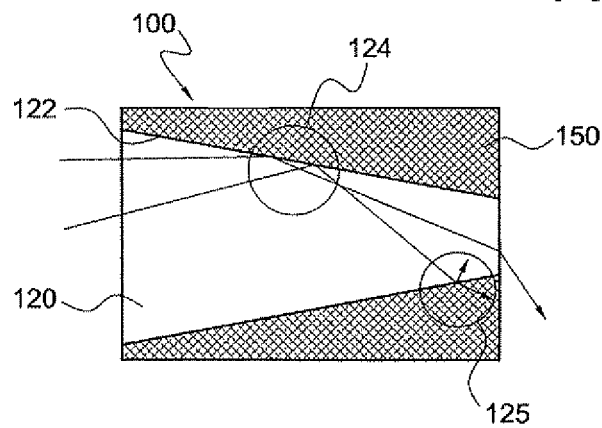
[Fig. 5]
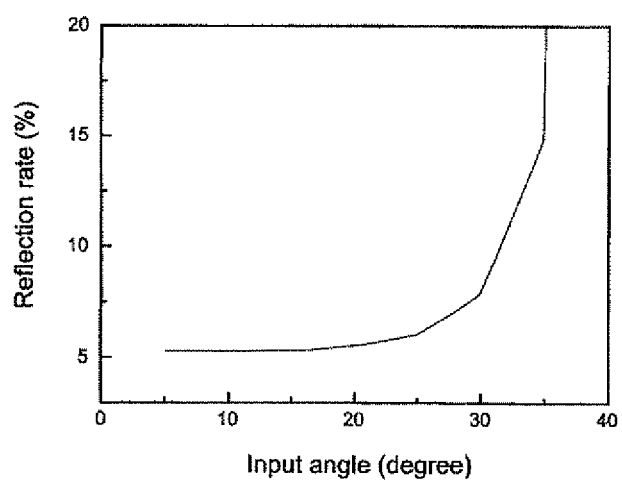
[Fig. 6]

[Fig. 7]
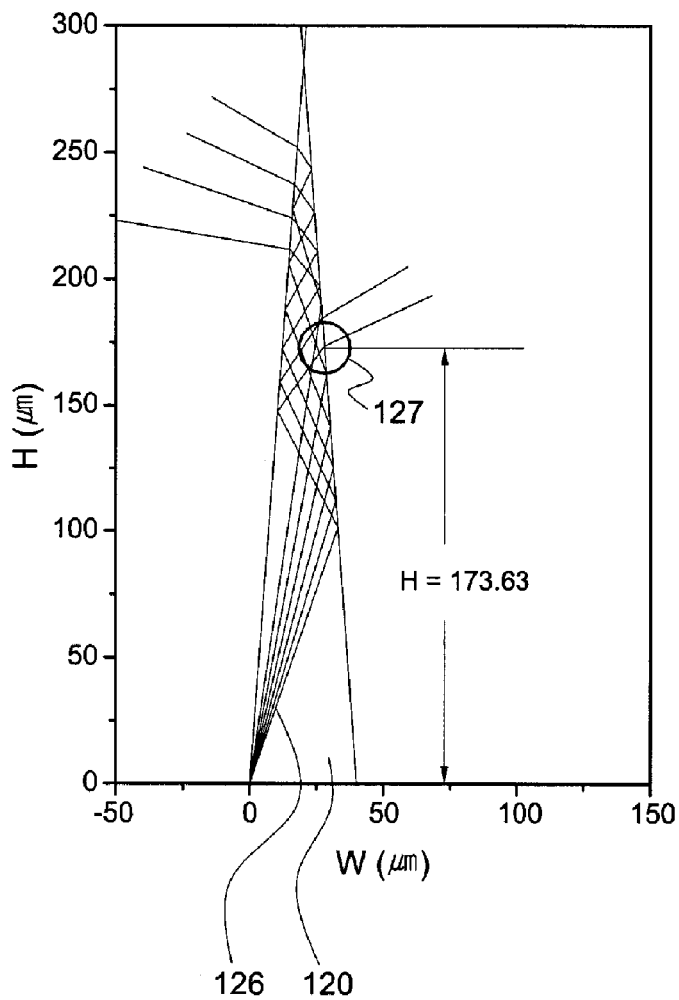
[Fig. 8]
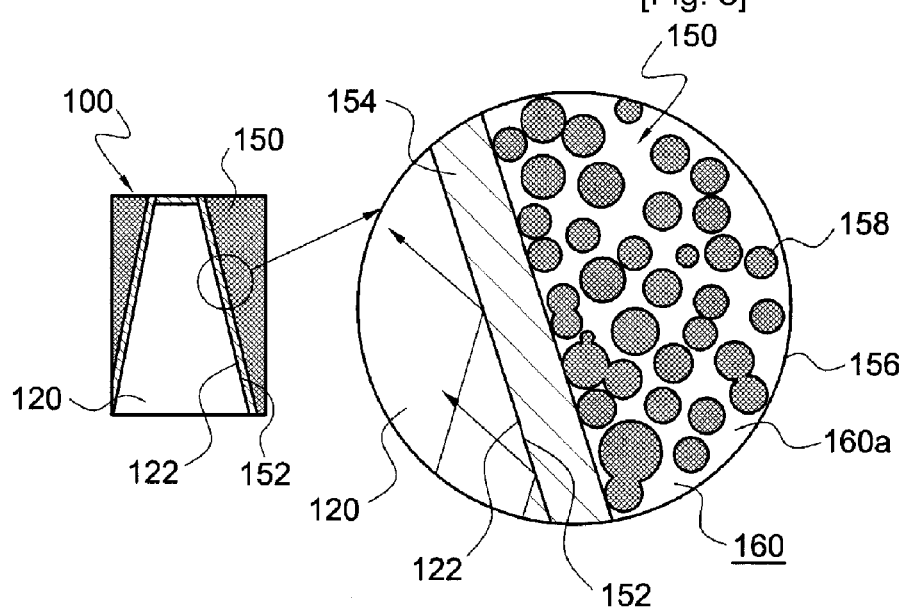

[Fig. 9]
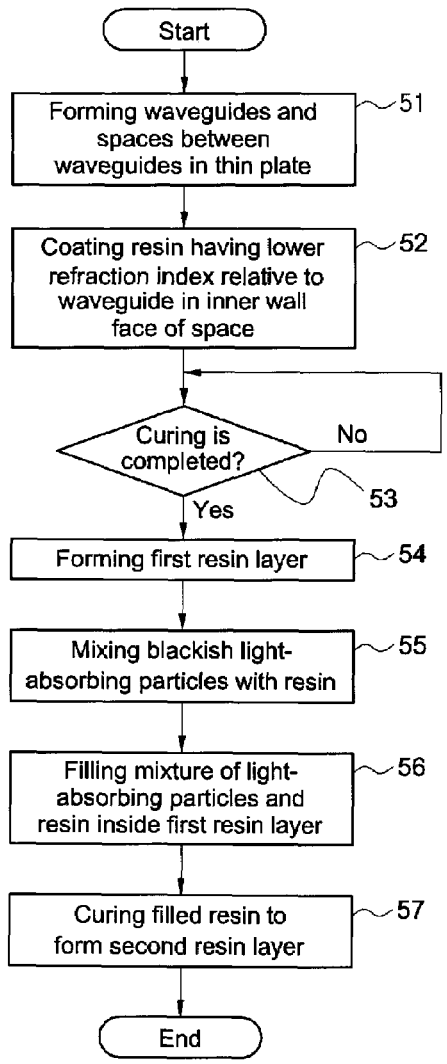
[Fig. 10]
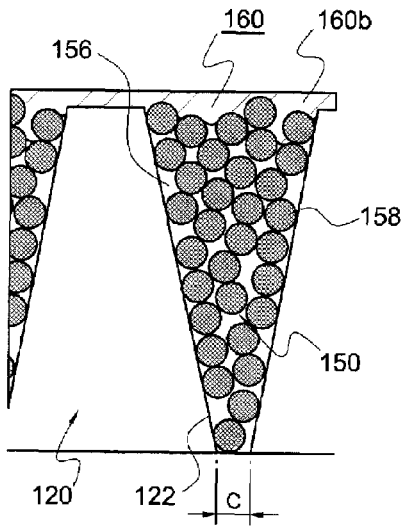

[Fig. 11]
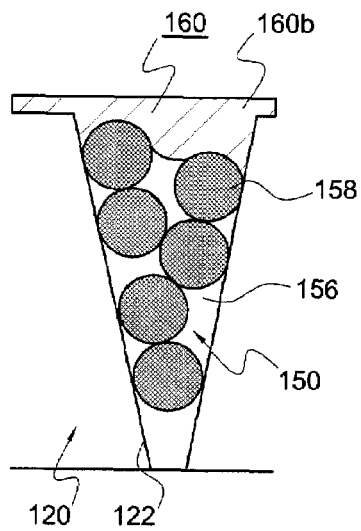
[Fig. 12]
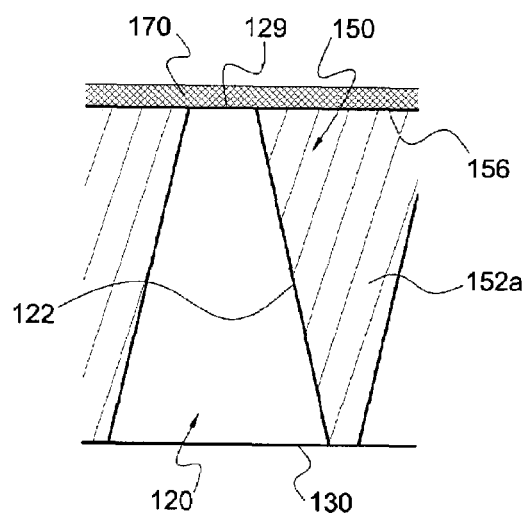
[Fig. 13]
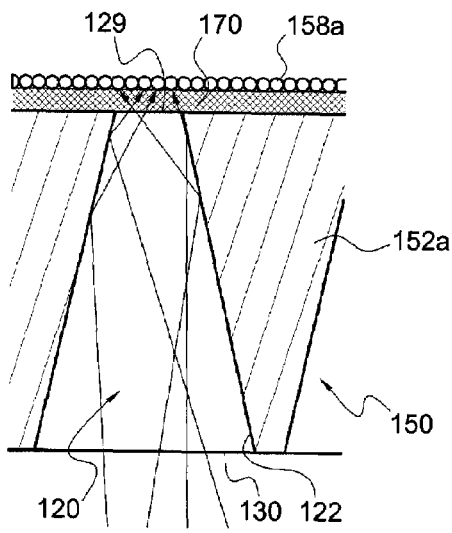

[Fig. 14]
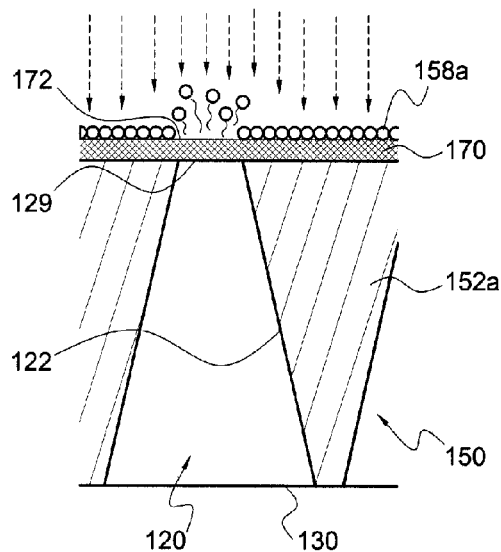
[Fig. 15]
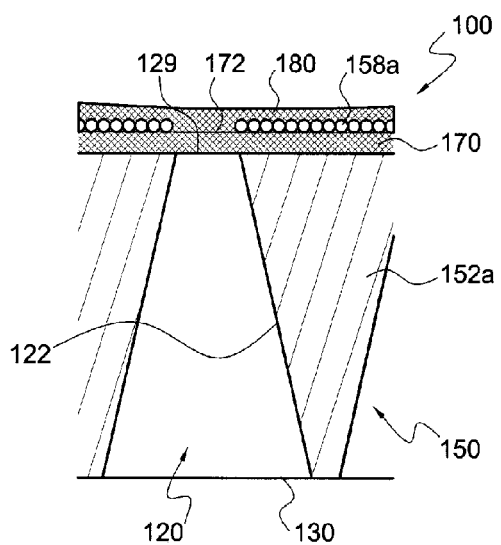
[Fig. 16]
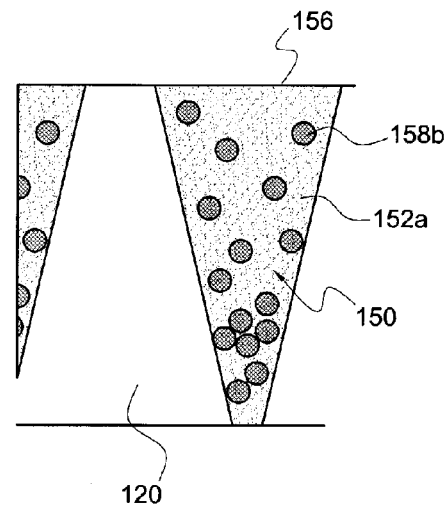

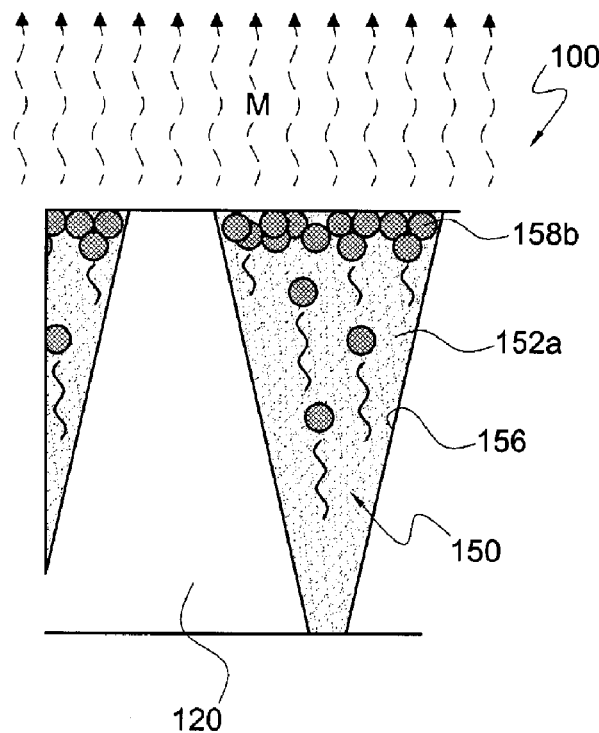
[Fig. 17]
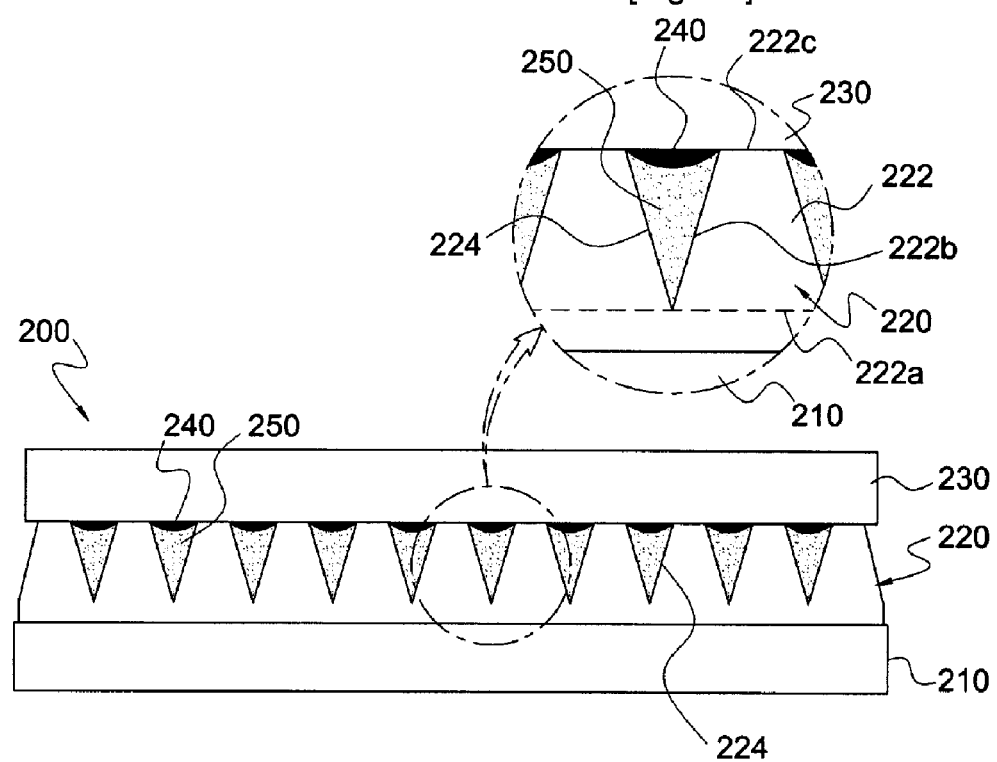
[Fig. 18]

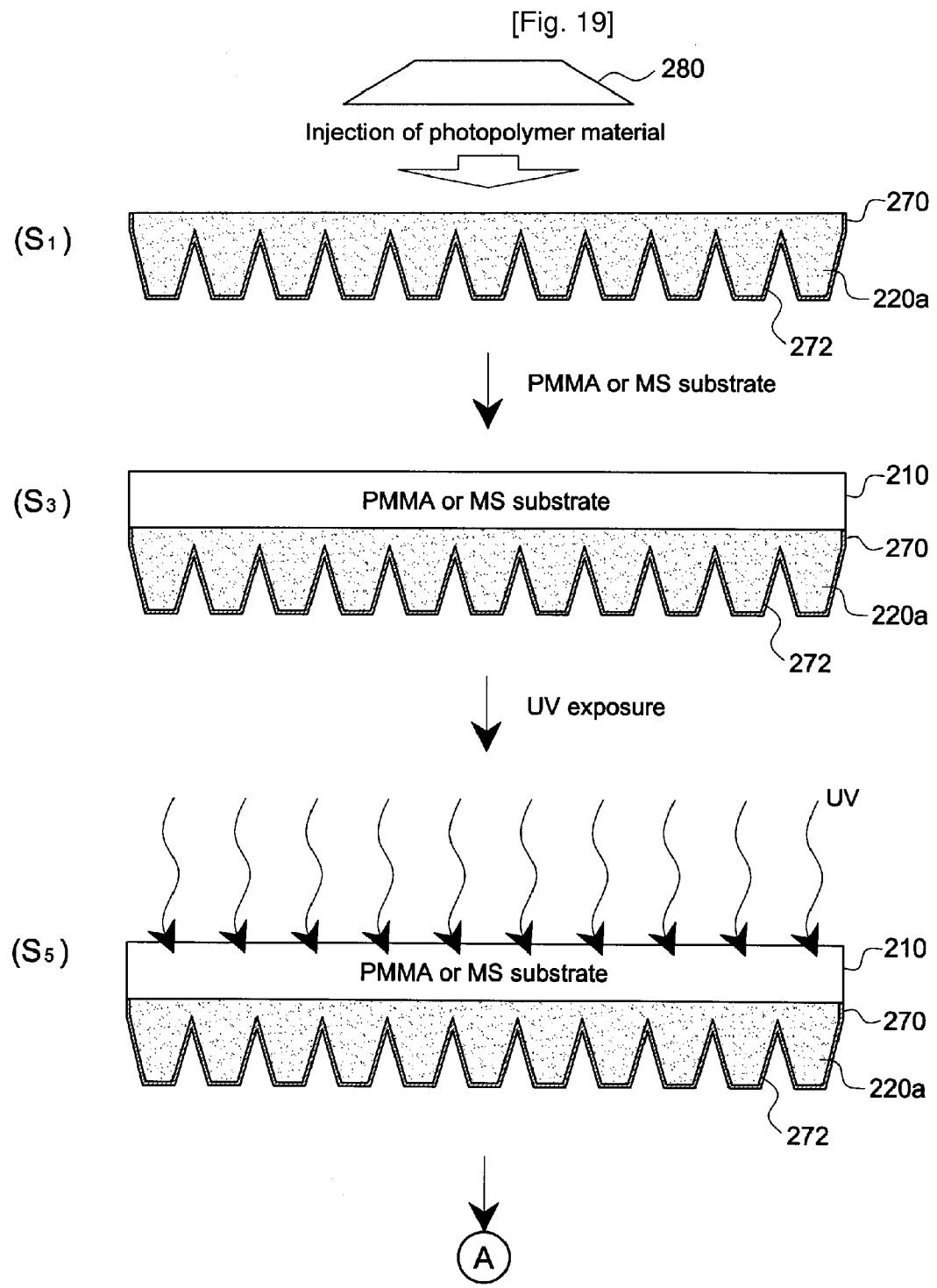

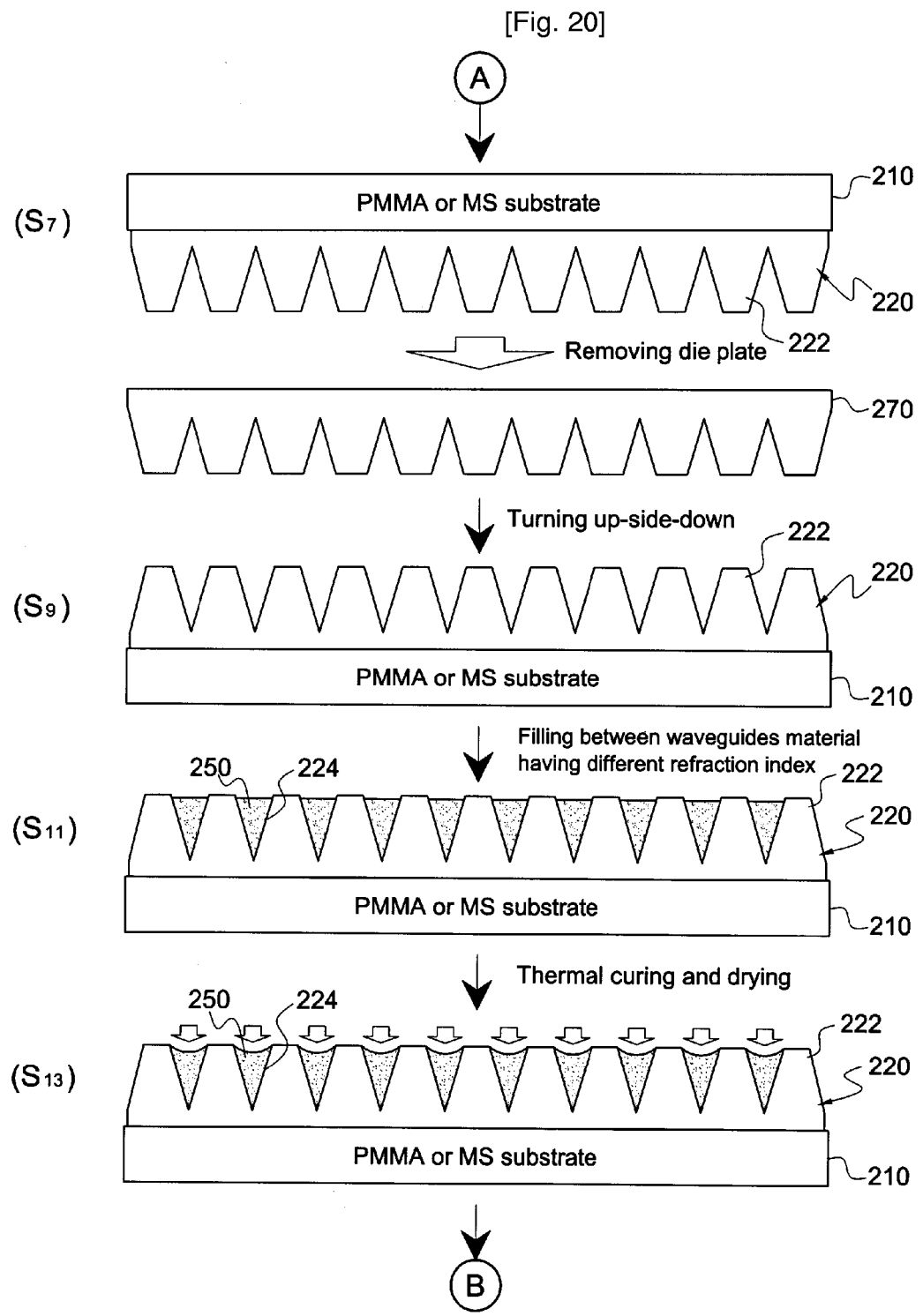

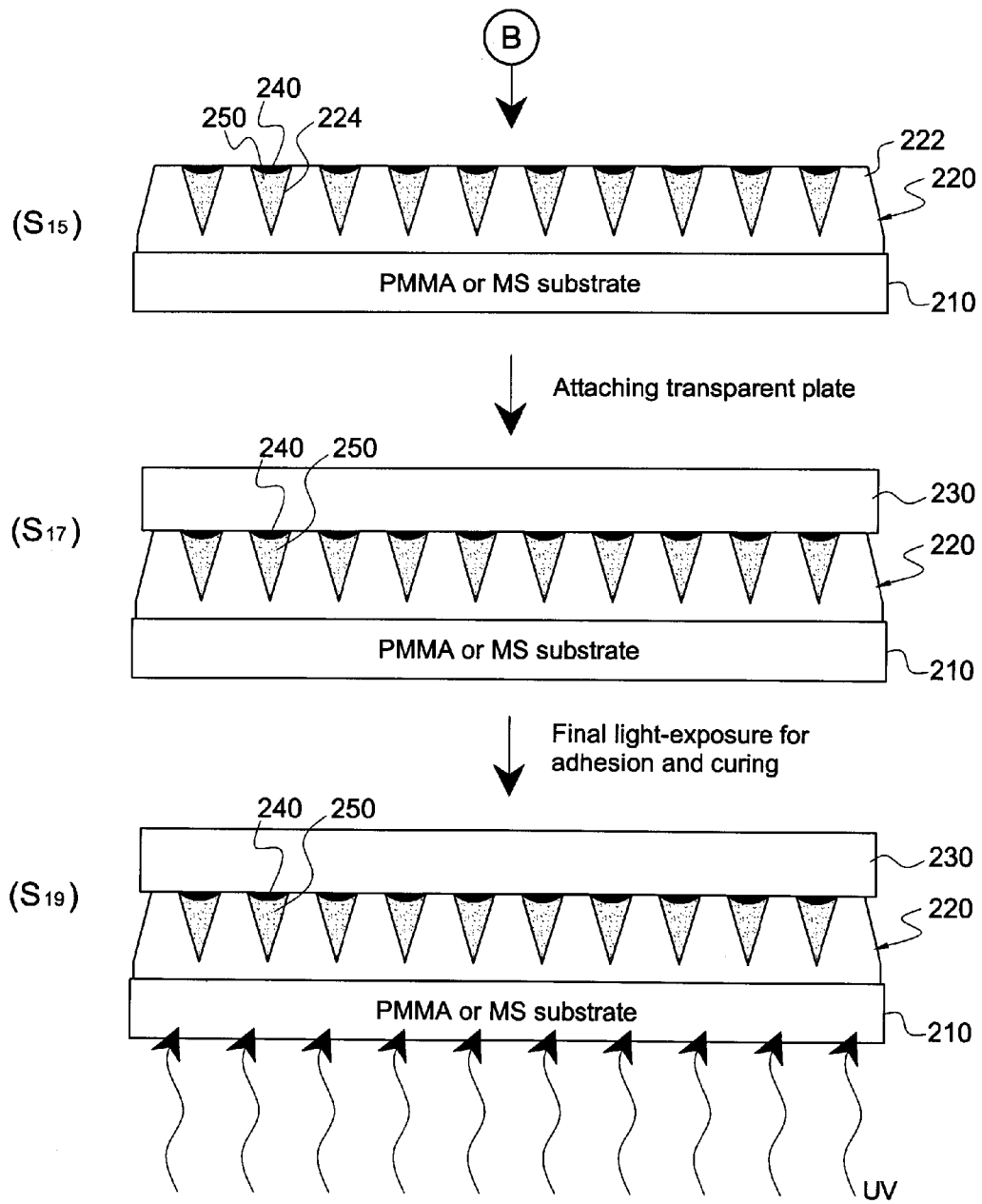
[Fig. 21]

OPTICAL DEVICE FOR A DISPLAY HAVING TAPERED WAVEGUIDE AND PROCESS FOR MAKING THE SAME

TECHNICAL FIELD

The present invention relates to an optical device for a display and a method of fabricating the same. More particularly, the invention relates to an optical device for a display having a tapered waveguide and a method of fabricating such devices.

BACKGROUND ART

In general, an optical device for a display such as a projection TV, a screen for rear-projection projectors, a TFT-LCD, a PDT TV, or a CRT monitor has a fine lens structure or a waveguide structure in order to broaden the viewing angle thereof. The present invention relates to an optical device for a display having a waveguide structure and a method of manufacturing such devices.

Conventional optical devices for displays will be explained in brief, referring to FIGS. 1 and 2.

FIG. 1 is an enlarged view of the screen of a conventional optical device for a display. FIG. 2 is an enlarged sectional view of a conventional optical device for a display.

As shown in FIGS. 1 and 2, the conventional optical device for a display 10 is provided with a light emitting region 12 for diffusing imaging light rays incident thereon and a light-absorbing region 14 for absorbing external lights and reducing reflection. As depicted in FIG. 2, the imaging light rays are diverged through the light emitting region 12, i.e., the imaging light rays are inputted into the optical device 10, and then their travelling paths are diverted through a fine lens 16 such that the light rays can be diverged. As such, the optical device of FIG. 2 requires numerous fine lenses on the surface thereof, which leads to a cumbersome manufacturing process.

U.S. Pat. Nos. 3,279,314 and 5,462,700 disclose an optical device for a display, in which fine tapered waveguides are uniformly distributed, instead of the above lenses.

FIG. 3 is a sectional view of an optical device for a display using a tapered waveguide;

As shown in FIG. 3, the optical device 20 having a tapered waveguide does not cause the light refraction, dissimilar to the optical device of FIG. 2 employing a lens 16.

In contrast, the optical device 20 of FIG. 3 is structured such that light rays are reflected on the inclined sidewall 23 of the waveguide 22 and guided so as to have an increased angle with respect to the sidewall 23 thereof when passing the waveguide 22, thereby providing image diffusion effect.

Sunlight or surrounding illumination may be reflected on the front face of the optical device 20, so that the observed image may be relatively dark or blocked by means of unnecessary light rays. In order to minimize this phenomenon, the light-absorbing region 24 of FIG. 3 is structured in such a way that a black material is coated or filled in the area excepting the light-diverging region of the optical device 20, thereby absorbing the surrounding light rays.

The above-mentioned waveguide 22 employs light reflection on the interface between two mediums having different refraction indices. The incident light rays are totally reflected, or partially reflected and partially passes through the interface, depending upon the magnitude of the incident angle. In order to improve the efficiency of reflection occurring inside the tapered waveguide 22, the larger the difference in the refraction indices between two mediums is the more effective.

In U.S. Pat. No. 5,462,700, the waveguide is formed using ultraviolet rays and thus usable medium is limited and the selection range for mediums having a lower refraction index is more narrowed. In addition, in U.S. Pat. No. 6,538,813, a metallic coating is further provided in the reflection wall (interface between mediums), or after providing the metallic coating and removing the waveguide, the remaining metallic coating is used for reflection medium, thereby maximizing reflection effect. Due to the trend of pursuing a large-scale screen, these patented inventions cause an increase in the number of process steps and the materials cost, and thus fail to meet the current or future requirements therefor. The material disclosed in U.S. Pat. No. 5,462,700 has a maximum refraction index of 1.6 and the lower index resin filled in the surroundings is limited to around 1.3. Thus, a difference of about 0.3 in refraction indices between two mediums causes a difficulty and limitation in the design of a waveguide. In addition, at present, the screen for a projection TV is manufactured up to 61 inches and, in case of PDP, up to 80 inches. In case of such large-scale screens, provision of a metallic coating to the front face thereof causes many difficulties and problems, in terms of quality, productivity, facility or the like. In particular, it is difficult to selectively coat only the sidewall of a waveguide excepting the light output surface. An expensive facility is required for depositing a large screen in a short period of time. In terms of productivity related to mass production, the competitive force thereof may be lowered.

In addition, the light-absorbing region is formed of a resin having a low refraction index relative to the waveguide and dispersed with fine carbon black particles or a black colorant. In particular, U.S. Pat. No. 5,462,700 employs the former method, and mentions that the carbon black particles must be controlled not to be contacted with the sidewall of the waveguide.

The light-absorbing material contains fine carbon particles as its main constituent, and absorbs lights flowing in the screen from the outside so as not to be reflected on the front face of the screen. Thus, it provides a more distinct and clear screen image to the viewers.

In the conventional screen structure, however, since the light-absorbing material is filled in the inverted-conical spaces between the waveguides, the light projected through the waveguide is absorbed in the light-absorbing material while reflecting inside the waveguide, thereby causing light loss. Thus, distinctness of images is deteriorated and consequently screen resolution is degraded.

Referring to FIG. 4, the above problems in the art will be explained below.

FIG. 4 is a partial enlarged view of a light-absorbing region filled with carbon black particles.

As shown in FIG. 4, the light rays incident into the waveguide 20 are reflected on the inclined sidewall 23 of the waveguide 20. At this time, if the carbon black particles 25 are contacted with the sidewall 23, the incident imaging light is not reflected, but absorbed in the carbon black particles 25 by means of the black body effect, thus consequently leading to loss in the light quantity to be diverged in the light output surface.

Some patents, for example, U.S. Pat. No. 6,417,966, propose a process for black-treating the front exposed portion only of the resin, instead of dispersing carbon-black particles. However, the process itself lacks practicality and cannot be easily applied to a practical manufacturing process.

In addition, U.S. Patent Application Publication No. 2002/0080484 discloses a waveguide structure to solve the problems in the art, in which the space between the waveguides remains empty, and a black film is covered on top of the empty space. However, this publication fails to propose a suitable process for forming the structure. The above black film disposed between the waveguides without any support structure, due to its instability, cannot become a complete solution to the prior art problems.

DISCLOSURE OF INVENTION

Technical Problem

It is an object of the invention to provide an optical device for a display, in which imaging light rays can be maximally prevented from being absorbed into the light-absorbing region, to thereby enhance the luminance of a screen.

Another object of the invention is to provide a method of fabricating such optical devices in a simplified manner.

A further object of the invention is to provide an optical device for a display capable of easily controlling reflectivity and transmissibility inside the waveguide.

Technical Solution

The objects of the invention can be accomplished by minimizing the contact between the imaging light rays inside the waveguide and the light-absorbing particles, or by disposing the light-absorbing material near the surface only of the optical device.

In order to accomplish the above objects, according to one aspect of the invention, there is provided an optical device for a display including tapered waveguides disposed at intervals and a space for forming a light-absorbing region disposed between the waveguides. The tapered waveguide has an inclined face for reflecting and diffusing incident lights, and the light-absorbing region is intended to absorb external lights and reduce reflection. The light-absorbing region comprises: a first resin layer coated and cured along the inner wall face of the space, the first resin layer being formed of a resin having a refraction index different from the sidewall of the waveguide, preferably a lower refraction index relative to the sidewall of the waveguide, the first resin layer being free of blackish light-absorbing particles; blackish light-absorbing particles filled in the space outside the first resin layer and for absorbing external lights; and a light-absorbing particle holder for fixing the light-absorbing particles.

In general, a material having a refraction index smaller than that of the sidewall of the waveguide is fixedly disposed in the inner side of the sidewall of the space. In some cases, a material having a refraction index larger than the sidewall of the waveguide may be employed. The critical angle for total reflection at an interface between two mediums is determined, depending on the difference in their refraction indices. In general, as the difference in the refraction indices increases, the critical angle becomes larger, i.e., the total reflection probability increases.

However, even when the difference in the refraction indices is small or lights travels from a lower index medium to a higher index medium, light reflection occurs, along with light transmission. Both the reflection and the transmission can be employed simultaneously, and controlled through the refraction indices, depending on the applications and purposes therefor. A difference in the refraction indices between two mediums forms an interface in-between. When the light passes through the interface, its travelling path is diverted at the interface. Thus, by controlling their refraction indices, the light can be guided in a certain desired direction and the light quantity can be controlled. In particular, in the case of the tapered waveguide of the invention, as the light continues to reflect on the interface (the sidewall of the waveguide), the input (incident) angle increases. If the input angle increases beyond the critical angle thereof, the light passes through the interface. In some cases, advantage may be taken of this phenomenon.

Preferably, the light-absorbing particle holder includes a second resin layer, which is mixed with the blackish light-absorbing particles, and filled and cured in the inside of the first resin layer, and the waveguide is preferred to be a cell-type waveguide, rather than a line-type waveguide.

In certain circumstances, the light-absorbing particle holder may include a coating layer formed in such a way that a transparent resin is coated and cured in the opening of the space filled with the light-absorbing particles.

The first resin layer may be formed of a thermoplastic resin such as glycidyl metacrylate, vinyl silicon or the like.

Preferably, the second resin layer and the coating layer are formed of a thermoplastic resin such as glycidyl metacrylate, vinyl silicon or the like, which have a refraction index equal to or lower than that of the first resin layer.

The blackish light-absorbing particles may include blackish fine particles such as carbon black, iron oxide particles, or black spherical resin particles.

According to another aspect of the invention, there is provided with a method of fabricating an optical device for a display having a waveguide, by forming tapered waveguides on a thin plate so as to be disposed at intervals and have an inclined face for reflecting and diffusing incident lights, and forming a space for a light-absorbing region disposed between the waveguides and for absorbing external lights and reducing reflection. The method of the invention comprises steps of: coating a first resin on the inner wall face of the space, the first resin having a refraction index different from the waveguide, preferably a refraction index lower than that of the waveguide; curing the first resin to form a first resin layer on the inner wall of the space; filling blackish light-absorbing particles in the space outside the first resin layer; and fixing the filled light-absorbing particles inside the space.

The light-absorbing particles filling step may include a step of mixing the light-absorbing particles with a second resin and filling the mixture, and the light-absorbing particles fixing step includes a step of curing the second resin filled inside the space.

Alternatively, the light-absorbing particles filling step may include a step of filling the light-absorbing particles in the space without mixing with a resin, and the light-absorbing particles fixing step includes a step of coating and curing a transparent resin in the opening of the space filled with the light-absorbing particles.

The tapered waveguide of the invention has a light input surface having a relatively larger area and a light output surface having a relatively smaller area, which are in parallel to each other. In addition, the shape of the light input surface may take on all the polygonal shapes such as a square, a rectangle, and a rhombus, or a circle, or an oval. The light output surface may be the same, or may have a different shape from the light input surface. The sidewall of the waveguide has basically a plane shape, but may take on a curved surface. The sidewall of the waveguide is inclined at a certain angle with respect to the input angle of imaging light rays. Each of the waveguides may have a different inclination angle.

The optical device of the invention having the above-described construction has an improved structure capable of enhancing the luminance of a screen. In particular, the shape of the tapered waveguide and the surrounding area thereof are improved together such that loss in the light quantity can be minimized to thereby increase light efficiency.

According to another aspect of the invention, there is provided an optical device for a display including tapered waveguides disposed at intervals and a space for forming a light-absorbing region disposed between the waveguides. The tapered waveguide has an inclined face for reflecting and diffusing incident lights, and the light-absorbing region is intended to absorb external lights and reduce reflection. The light-absorbing region comprises: a first resin filled and cured in the space, the first resin having a refraction index different from the waveguide, preferably a refraction index lower than that of the waveguide; and blackish light-absorbing particles drawn and arranged near the surface of the first resin by a magnetic force and fixed in place by curing of the first resin.

The light-absorbing particles are preferred to be fine particles such as iron oxide particles having a magnetic property.

The first resin may include a thermoplastic resin such as glycidyl metacrylate, vinyl silicon or the like.

According to another aspect of the invention, there is provided a method of fabricating an optical device for a display having a waveguide, by forming tapered waveguides on a thin plate so as to be disposed at intervals and have an inclined face for reflecting and diffusing incident lights, and forming a space for a light-absorbing region disposed between the waveguides and for absorbing external lights and reducing reflection. The method of the invention comprises steps of: mixing blackish light-absorbing particles with a liquid-phase first resin, the light-absorbing particles having a magnetic property and the first resin having a refraction index different from the waveguide, preferably a refraction index smaller than that of the waveguide; filling in the space the first resin with the light-absorbing particles mixed therewith; exerting a magnetic force to the first resin filled in the space such that the light-absorbing particles are floated near the surface of the first resin; and curing the first resin filled in the space.

Preferably, the mixing step includes a step of mixing iron oxide particles with the first resin.

According to another aspect of the invention, there is provided an optical device for a display including tapered waveguides disposed at intervals and a space for forming a light-absorbing region disposed between the waveguides. The tapered waveguide has an inclined face for reflecting and diffusing incident lights, and the light-absorbing region is intended to absorb external lights and reduce reflection. The light-absorbing region comprises: blackish light-absorbing particles filled in the space and for absorbing external lights and reducing reflection; and a coating layer formed in such a way that a transparent resin is coated and cured in the opening of the space filled with the light-absorbing particles, wherein the blackish light-absorbing particles have a diameter larger than a half of a spacing between the larger faces of the waveguides and smaller than the spacing, and are stacked in three or more layers.

The coating layer may be formed of a thermoplastic resin such as glycidyl metacrylate, vinyl silicon or the like.

The blackish light-absorbing particles may include blackish fine particles such as carbon black, iron oxide particles, or black spherical resin particles, and the light-absorbing particles is filled in the space without a resin.

The light-absorbing particles are preferred to have a uniform size.

According to another aspect of the invention, there is provided a method of fabricating an optical device for a display, only whose surface is coated with a light-absorbing material.

The method of the invention comprises: a first step of injecting a photopolymer material of liquid state into a die plate, the die plate having first spaces arranged in horizontal and/or vertical directions, the space having a shape corresponding to that of the waveguide; a second step of attaching a transparent substrate to one face of the photopolymer material, which corresponds to a bottom face of the waveguide; a third step of forming a waveguide array in such a manner that ultraviolet rays are radiated to the photopolymer material, which thereby is photo-polymerized to be cured; a fourth step of removing the die plate from the waveguide array; a fifth step of filling and curing a filling material in second spaces formed between the waveguides in the waveguide array, the filling material having a refraction index different from the waveguide; and a sixth step of coating a light-absorbing material on the surface of the filling material and attaching a front transparent plate.

In the first step, preferably the first spaces have a truncated conical shape or a truncated polypyramidal shape.

In the second step, the transparent substrate is formed preferably of a PMMA or MS material.

In the fifth step, before filling he filling material in second spaces formed between the waveguides, the waveguide array is turned up-side-down.

The fifth step may include steps of: filling the filling material in a liquid state into the second spaces between the waveguides; and thermal-curing and drying the filling material, wherein the filling material is contracted during the thermal-curing and drying to form a concave depression in the surface thereof.

The sixth step may include steps of: coating the light-absorbing material in the concave depression of the filling material; attaching a front transparent plate to the surface of the waveguide array coated with the light-absorbing material; and radiating ultraviolet rays to adhere and cure the front transparent plate to the waveguide array.

The light-absorbing material may contain carbon black as the main constituent thereof.

The light-absorbing material is coated through an extrusion coating process, a slot-die coating process, or a screen printing method.

According to another aspect of the invention, there is provided an optical device for a display being coated with a light-absorbing material on the surface thereof only. The optical device comprises: a transparent substrate; a waveguide array having waveguides attached on the transparent substrate and arranged in horizontal and/or vertical directions; a front transparent plate attached on top of the waveguide array; a filling material filled in spaces between the waveguides and having a refraction index different from the waveguide; and a light-absorbing material coated on the surface of the filling material.

The bottom faces of neighboring waveguides are contacted with each other, and the spaces between the waveguides forms a pointed tip space inwards thereof.

The filling material may be constituted in such a way that a liquid material having a refraction index smaller than that of the waveguide is injected into the spaces and thermally cured.

The light-absorbing material is coated in a depressed portion of the filling material caused by the thermal curing thereof, preferably such that the coated light-absorbing material is aligned with the top surface of the waveguide.

The waveguide of the present invention having the above-described structure is most suitably applied to a tapered waveguide with its four lateral faces all inclined, which can be separated from each other and disposed in a cell-pattern, (refer to FIG. 12 in U.S. Pat. No. 5,462,700).

In some cases, of course, the waveguide structure of the invention can be applied to a waveguide having two slanted lateral faces and arranged in a line-pattern.

Advantageous Effects

As described above, the optical device according to the invention has an improved light efficiency, and thus can provide for a product having an excellent luminance, as compared with the conventional ones, when using an identical light source.

In addition, according to the invention, an optical device for a display having a stabilized light-absorbing region can be obtained.

Furthermore, the present invention provides a simplified process for fabricating such optical devices, thus improving production efficiency.

In the case where fine particles having magnetic property such as iron oxide is used as the light-absorbing particles, the fabrication process can be simplified. When the final product is used as a screen, the magnetic particles absorb electromagnetic waves, thereby enabling to expect other additional effects.

According to the invention, the spaces between the waveguides is filled with a material, preferably, having a refraction index lower than that of the waveguide, and only the surface thereof is coated with a light-absorbing material, thereby minimizing light loss, which otherwise may be caused by the light-absorbing material.

According to the invention, when a mold process is employed in fabricating a waveguide array, the bottom faces of neighboring waveguides are not spaced apart, but consecutively contacted with each other. Thus, the light loss through between the waveguides can be minimized to thereby improve light efficiency.

The screen structure of a common-type lens projection TV is composed of a Fresnel lens and a lenticula lens. In general, the lenticula lens takes on a vertical line-pattern, which differs from a cell-pattern structure. In the conventional screen, the open area is structured in vertical lines and thus external lights entered from the upper side thereof are reflected on the Fresnel lens. In the present invention, however, a cell-pattern structure can be employed, instead of the line-pattern, thus reducing the above reflection phenomenon of input light. In addition, the conventional line-type uses a diffusion plate at its front side to thereby form a vertical viewing angle. The present invention employs a cell-type structure to thereby be able to form the vertical viewing angle on its own.

BRIEF DESCRIPTION OF THE DRAWINGS

FIG. 1 is an enlarged view of the screen of a conventional optical device for a display;

FIG. 2 is an enlarged sectional view of a conventional optical device for a display;

FIG. 3 is a sectional view of an optical device for a display using a tapered waveguide;

FIG. 4 is a partial enlarged view of a light-absorbing region filled with carbon black particles;

FIG. 5 is a schematic diagram showing the path of imaging light rays inputted inside the waveguide;

FIG. 6 is a plot of reflection rate versus input angle between two mediums having a difference of 0.6 in their refraction indices;

FIG. 7 is a diagram illustrating the path of imaging light rays within the waveguide, depending upon the input angles thereof;

FIG. 8 is a sectional view of the waveguide and its surrounding light-absorbing region in an optical device according to an embodiment of the invention;

FIG. 9 is a flow chart explaining a method of fabricating an optical device according to the invention;

FIGS. 10 and 11 are sectional views showing another embodiment according to the invention;

FIGS. 12 to 15 are sectional views of an optical device according to yet another embodiment of the invention and explaining a method of manufacturing the optical device;

FIGS. 16 and 17 are sectional views of an optical device according to a further embodiment of the invention and explaining the fabrication method thereof;

FIG. 18 illustrates a rear-projection screen according to a further embodiment of the invention; and FIGS. 19 to 21 are schematic diagrams illustrating a method of fabrication an optical device according to the invention.

BEST MODE FOR CARRYING OUT THE INVENTION

The preferred embodiments of the present invention will be hereafter described in detail with reference to the accompanying drawings.

Referring to FIG. 5, imaging light rays are inputted into a waveguide 120 of an optical device for a display 100 and the input imaging light rays are reflected on the sidewall 122 of the waveguide 120. At this time, the imaging light rays are totally reflected on the sidewall 122 or passes through the sidewall 122, depending upon the input angle thereof. If the input angle of the imaging light rays is larger than the critical angle thereof (in case of light ray 124), the light rays are totally reflected or mostly reflected on the sidewall 122 of the waveguide 120. If the input angle of the imaging light rays is smaller than the critical angle thereof (in case of light ray 125), the imaging light rays are partially total-reflected, and partially pass through the waveguide 120 and absorbed in a light absorbing section 150, to thereby significantly decrease the reflection rate for the imaging light rays. In order to obtain an optical device for a display having a high optical efficiency, it must be designed such that incident imaging light rays can perform a total reflection on the inclined sidewall 122 of the waveguide 120.

As shown in the graph of FIG. 6, in case where two mediums have a difference of 0.6 in their refraction indices, if the input angle is above 35 degrees, the light rays are mostly totally reflected. When the input angle is 35 degrees, the reflection rate is around 15%. Thus, the length of the waveguide 120 is determined, depending upon the slope of the sidewall 122 in the waveguide 120, the refraction index of a medium surrounding the waveguide 120, and the size of the light input surface thereof. Each parameter is dominated by the following equation (1).

$$Qc=\sin^{-1}(ns/nw) \qquad (1)$$

Here, Qc denotes a critical angle for total reflection, nw denotes a refraction index of waveguide, and ns denotes an refraction index of surrounding medium.

Mode for the Invention

For example, FIG. 7 shows the light travelling path inside the waveguide in case where the width of light input surface is 40 mm, the gradient of waveguide sidewall is 4 degrees, the refraction index nw of waveguide is 1.6, the refraction index ns of surrounding medium is 1.3, and the light rays are incident at the range of from 0 to 10 degrees with respect to the axis H. As shown in FIG. 6, if the input angle is 10 degrees (in case of the light ray 126), the input light ray partially passes through the waveguide 120 at its fourth reflection 127. In this case, in order to reduce the light loss, the length of the waveguide 120 needs to be limited to 173 mm, which corresponds to the fourth reflection point.

The optical device 100 of FIG. 8 is structured such that the light loss due to the direct contact of carbon black with the sidewall 122 from the outer side of the waveguide 120, as described above, can be avoided. A first resin layer 154 is formed on the outer wall face of the waveguide 120, i.e., on the inner wall face 152 of the light-absorbing region 150. The first resin layer 154 is formed in such a manner that a resin having a smaller refraction index relative to the inner wall of the waveguide 120 is coated and cured in a space 156 formed between the waveguides 120. The first resin layer 154 is free of light-absorbing particles. Suitable examples of resins used for the first resin layer 154 may include a thermoplastic resin such as glycidyl metacrylate, vinyl silicon and the like.

As shown in FIG. 8, light-absorbing particles 158 are filled outside of the first resin layer 154, together with a particle holder 160. The light-absorbing particles 158 absorb external light rays to reduce the reflection rate of the external light, which is reflected frontward of the optical device. The light-absorbing particles 158 are formed of fine blackish particles, such as carbon black, iron oxide particles, black spherical resin particles, or the like. Here, the "blackish" means a color having a high light absorptivity, such as a black color, a dark brown, or the like.

The particle holder 160 for holding the light-absorbing particles 158 in place inside the light-absorbing region 150 is constituted of a second resin layer 160*a*, which is mixed with the blackish light-absorbing particles 158 and filled and cured outwards of the first resin layer 154. Exemplary materials for the second resin layer 160*a* are a thermoplastic resin such as glycidyl metacrylate, vinyl silicon and the like.

Referring to FIG. 9, the fabrication method of the invention will be described in detail.

First, a tapered waveguide 120 is formed in a thin resin plate having a high refraction index, and a space 156 to be formed into a light-absorbing region 150 is formed between the waveguides 120, i.e., in the surrounding areas of the waveguides 120 (step 51). Usually, the space 156 is formed simultaneously when the waveguides 120 are formed. This step can be carried out, through various known conventional processes, for example, disclosed in the previously mentioned US patents.

Next, a first resin is coated on the inner wall face of the space 156, i.e., on the outer wall face of the waveguide 120 (step 52). The first resin includes a thermoplastic resin such as glycidyl metacrylate, vinyl silicon and the like, which has a refraction index smaller than that of the waveguide 120. Then, the coated first resin is adequately cured (step 53) to form a first resin layer 154 (step 54). Blackish light-absorbing particles 158 such as carbon black, iron oxide particles, black spherical resin particles are mixed with a second resin (step 55). The mixture is filled in the space outside the first resin layer 154 (step 56). The second resin filled in the space 156 is cured to thereby form a second resin layer 160*a* (step 57). Here, the second resin layer 160*a* formed of the second resin holds the blackish light-absorbing particles 158. The second resin may employ the same materials as the first resin.

In some cases, only the blackish light-absorbing particles 158 (without the second resin) is filled in the space, and then a transparent third resin is hard-coated on top of the particles 158 to hold the light-absorbing particles in place inside the space 156. The third resin may also employ the same materials as the first resin.

That is, a resin having a lower refraction index relative to the waveguide is primarily coated and cured on the inner wall face of the space 156, and then another resin mixed with blackish light-absorbing particles 158 such as carbon black is filled and cured in the space 156. Thus, the sidewall 122 of the waveguide 120 is spaced apart from the light-absorbing particles 158 by a certain distance, which at least corresponds to the thickness of the first resin layer 154.

FIGS. 10 and 11 are sectional views showing another embodiment according to the invention.

In a certain case where the waveguide 120 does not have a high refraction index, or for some reasons an adequate difference of refraction indices does not occur between the waveguide 120 and a medium surrounding the waveguide 120. In this case, the space 156 around the waveguide 120 may remain filled with air having the refraction index of one (1), without necessity of filling a resin. Dissimilar to the previous embodiment, in this embodiment, blackish spherical light-absorbing particles 158 (without any resin) is filled in the space 156 and a transparent resin is hard-coated on the top of the particles to form a coating layer 160*b*. Thus, the coating layer 160*b* constitutes a particle holder 160 so that the light-absorbing particles 158 inside the light-absorbing region 150 can be stabilized. In this case, the conventional technique has employed a black film.

Here, the size of the light-absorbing particles 158 is limited, depending upon the gradient of the sidewall 122 of the waveguide 120 and the spacing between the waveguides 120. As shown in FIG. 10, if the light-absorbing particles 158 have a smaller diameter, they come to contact the sidewall 122 of the waveguide 120 more frequently, as compared with those with a larger diameter in FIG. 11, thus increasing light loss. As shown in FIG. 11, the relatively larger particles 158 reduces light loss due to less frequent contacts, but makes it difficult to be uniformly dispersed or may cause process defects. The light-absorbing particles 158 need to have an appropriate size, depending upon the waveguide design such as the gradient of the sidewall 122 thereof. As shown in FIG. 10, in order to reduce the contact frequency with the sidewall 122 of the waveguide while obtaining a uniform dispersion, it is preferable that the diameter of the light-absorbing particles 158 is larger than a half of the spacing c between the bottom faces of the waveguides and smaller than the spacing c. In addition, the light-absorbing particles 158 do not have adhesive force, and thus preferred to be stacked in more than three layers to thereby provide a structural stability. Furthermore, it is preferable that the light-absorbing particles 158 have a uniform size. Otherwise, the packing density thereof and the contact frequency with the sidewall 122 are increased. Relatively larger particles generate a relatively less number of contacts and thus are more favorable in reducing light loss.

As described above, in the optical device in FIGS. 10 and 11, blackish light-absorbing particles 158 such carbon black and iron oxide particles having a uniform size are filled in the space 156 without a resin. Then, a transparent resin is hard-coated and cured on the top thereof, to thereby form a coating layer 160*b*. In this way, a more stable light-absorbing region 150 can be obtained, as compared with U.S. Patent Application Publication No. 2002/0080484, in which a region extended from the end of the waveguide is blocked with a black film and the lower portion thereof remains empty.

FIGS. 12 to 15 are sectional views of an optical device according to yet another embodiment of the invention and explaining a method of manufacturing the display device.

Referring to FIGS. 12 to 15, a first resin 152a is filled and cured in an empty space 156 formed around the waveguide 120. The first resin 152a does not contain light-absorbing particles of blackish color such as carbon black and has a refraction index smaller than that of the waveguide 120. Thereafter, the front face of the optical device including the light output surface 129 of the waveguide 120 is coated with a photo-sensitive adhesive 170, which loses its adhesive force when exposed to ultraviolet rays. Then, light-absorbing fine particles 158a of blackish color are attached on the photo-sensitive adhesive 170. Subsequently, ultraviolet rays are radiated from the light input surface 130 towards the light output surface 129 such that the light output surface 129 of the waveguide 120 can selectively lose the adhesive force of the photosensitive adhesive and release the light-absorbing particles 158a attached thereon through a surface cleaning process. In this way, the optical device of this embodiment can be obtained, as shown in FIG. 14. That portion, where the light-absorbing particles 158a are removed, forms a particle-free region 172 that allows light to pass through the waveguide 120 from the light input surface 130 towards the front face of the device.

Here, the photosensitive adhesive may be in a film form or in a liquid form, or any other form of adhesive or resin as long as it has a strong adhesive force, but loses its adhesive force when exposed to ultraviolet radiation. After cleaning and drying, a transparent resin layer 180 may be further formed for the purpose of surface stabilization and protection.

Here, a thermoplastic resin such as glycidyl metacrylate, vinyl silicon or the like is suitable for the first resin. Examples for the blackish light-absorbing particles may include fine particles of black color such as carbon black or iron oxide particle.

In addition, the photosensitive adhesive 170 may include acrylic or iso-vinyl photopolymerizable adhesive.

That is, the optical device described in conjunction with FIGS. 12 to 15 is fabricated through the following procedures. First, tapered waveguides having a slant face for reflecting and diffusing incident lights are formed on a thin resin plate so as to be disposed at regular intervals thereon. Filled and cured between the tapered waveguides is a first resin having a refraction index smaller than that of the waveguide 120. The surface of the light output surface 129 side, i.e., the surface of the narrower side of the waveguide 120 is coated with a photosensitive adhesive 170, which loses its adhesive force when exposed to ultraviolet rays. On the surface of the coated photosensitive adhesive 170 are attached light-absorbing particles 158a of blackish color for absorbing external light and reducing the quantity of reflected lights. Thereafter, ultraviolet rays are radiated, from the opposite side of the coated photosensitive adhesive 170, i.e. from the light input surface 130, via the waveguide 120, towards the light output surface 129, i.e., towards the coated photosensitive adhesive 170. Then, the blackish light-absorbing particles disposed on the waveguide 120 are released from the photosensitive adhesive 170.

In some cases, a transparent resin may be coated on the adhered black light-absorbing particles 158a and cured to thereby form a transparent resin layer 180, which thereby stabilizes the fixed light-absorbing particles.

Referring to FIGS. 16 and 17, blackish fine light-absorbing particles 158b having a magnetic property such as iron oxide particles are uniformed dispersed in a first resin 152a having a refraction index lower than that of the waveguide 120. Then, the first resin with the light-absorbing particles 158b dispersed therein is filled in the space 156, i.e., the surrounding area of the waveguide 120. Before the first resin 152a is cured, a magnetic force M is exerted on the front face of the optical device 100 such that the fine light-absorbing particles can be floated on the surface of the first resin 152a and then cured. In this way, the optical device 100 of this embodiment is fabricated.

Here, similar to the previous embodiments, suitable materials for the first resin 152a may include a thermoplastic resin such as glycidyl metacrylate and vinyl silicon.

That is, formed on a thin resin plate are tapered waveguides 120 each having a slant face for reflecting and diffusing incident lights and a space 156 disposed between the waveguides for forming a light-absorbing region 150, which absorbs external lights and reduces reflection. Blackish light-absorbing particles 158b having a magnetic property are mixed with a liquid first resin 152a having a refraction index smaller than the waveguide 120. After the mixture is filled in the space 156 and before the first resin 152a is cured, a magnetic force M is exerted towards the surface of the first resin 152a such that the light-absorbing particles can be floated up to near the surface of the first resin 152a and cured as they are floated, thereby ultimately fabricating the optical device 100 of this embodiment.

In this embodiment, instead of carbon black, fine particles such as iron oxide particles having a magnetic property are employed and an appropriate magnetic force is applied when curing the resin, thus simplifying the fabrication process. Furthermore, in the case where the final product is used as a screen, the magnetic particles absorb electromagnetic waves, thereby enabling to expect other additional effects.

FIG. 18 illustrates a rear-projection screen according to a further embodiment of the invention where the projection screen of the invention is denoted by a reference numeral 200.

As depicted in FIG. 18, the projection screen 200 of the invention has a layered structure, in which a waveguide array 220 is disposed on a transparent substrate 210 and a front transparent plate 130 is attached frontward of the waveguide array 220. In particular, the waveguide array 220 is constructed in such a manner that a plurality of waveguides 222 is arranged in vertical and/or transversal directions. The waveguide 222 may have a truncated conical shape or a truncated polypyramidal shape. In the structure of the waveguide array 220, it is preferred in terms of light-use efficiency that the bottom faces 222a of neighboring waveguides 222 are contacted with each other. In this case, the contacting area of the neighboring bottom faces 222a forms a pointed tip. Thus, the waveguide array 220 is fabricated using a metallic die so as not to produce a gap between the bottom faces 222a of adjacent waveguides 222. A method of fabricating the projection screen of the invention will be hereinafter described, referring to FIGS. 19 to 21.

In addition, the waveguide 222 has an inclined sidewall 222b. Accordingly, a space 224 having an inverted triangular cross-section formed between the neighboring waveguides 222. In general, the space 224 is filled with a light-absorbing material, the intended purpose of which is to absorb external light incident on the projection screen 200. However, since the light absorbing material filled in the space 224 is contacted with the sidewall 222b of the waveguide 222, it also absorbs the light passing through the waveguide 222 to thereby cause a dysfunction of decreasing the light efficiency. In order to avoid this light loss, according to the invention, the surface area of the space 224 is filled with a light-absorbing material 240 and the lower portion of the space 224 is filled with a filling material 250 having a refraction index different from that of the waveguide 222. The filling material 250 has a refraction index lower than that of the waveguide 222, and filled in liquid state and cured. The filling material 250 is very low in its light absorptivity, relative to the light-absorbing material 240, or does not have substantial light absorptivity. The light-absorbing material 240 is formed, typically, of carbon black as its main constituent. For example, it may be formed by mixing monarch-carbon black, baysilon-platinum catalyst, and vinyl silicone. The light-absorbing material 240 of this composition exhibits generally a black color.

Hereafter, the method of the invention will be explained in detail, referring to FIGS. 19 to 21.

First, a photopolymer material 220a in liquid state is injected into a die plate 170 for fabricating a waveguide array (step $S_1$). Here, the photopolymer material 220a is injected from a photopolymer material mixer 280 into the die plate 270 in a liquid state. The die plate 270 has a plate structure formed in such a way that a plurality of spaces 272 each having the shape of a conical frustum or a polypyramidal frustum is arranged in vertical and/or transversal direction. The shape of the space 272 corresponds to that of the waveguide. Each space 272 in the die plate 270 casts and forms each waveguide, and the connecting area between the spaces 272 forms a pointed tip. That is, when cast and formed, the bottom faces of adjacent waveguides are contacted with one another while forming pointed tip in-between.

After the photopolymer material 220a is injected into the die plate 270, a rear transparent substrate 210 is attached to one face of the photopolymer material 220a, which corresponds to the bottom face of a waveguide (step $S_3$). Suitable materials for this transparent substrate 210 include polymethyl methacrylate (PMMA) or an MS material. Then, ultraviolet rays are radiated from the transparent substrate 210 side to photo-polymerize and cure the photopolymer material 220a (step $S_5$). The photopolymer material 220a is cured and forms a waveguide array 220 composed of waveguides 222 arranged in horizontal and/or vertical directions. Thereafter, the die plate 270 is removed from the waveguide array 220 (step $S_7$). An adhesive material may be interposed between the waveguide array 220 and the transparent substrate 210, in order to strengthen the adhesion in-between.

After removing the die plate 270, the waveguide array 220 with the transparent substrate 210 attached thereto is turned up-side-down (step $S_9$). Then, the filling material 250 having a refraction index different from the waveguide is filled in the space 224 formed between the waveguides 222 in the waveguide array 220 (step $S_{11}$). Preferably, the filling material 250 has a refraction index lower than that of the waveguide and is filled in a liquid state. Thereafter, the filling material 250 is thermally cured and dried (step $S_{13}$). At this time, the filling material 250 is contracted while being cured, so that the surface of the filling material 250 is depressed in a concave form. The surface depression has generally a half-moon shape. The surface depression of the cured filling material 250 is coated with a light-absorbing material 240 (step $S_{15}$). The light-absorbing material can be coated through an extrusion coating process, a slot die coating process, or a screen printing method. Among them, when using the extrusion coating, a blotter is used for preventing the top surface of the waveguide from being stained with the light-absorbing material.

After coating the light-absorbing material 240, a front transparent plate 230 is attached to the front surface of the waveguide array 220 (step $S_{17}$) where the light-absorbing material 240 is placed. The front transparent plate 230 may be provided with a diffusing function, together with a projection function of the waveguide 222. After the front transparent plate 230 is attached, ultraviolet rays are radiated again to perform a final adhesion and curing, thereby ultimately obtaining a projection screen 200 of the invention (step $S_{19}$).

An adhesive material may be interposed between the waveguide array 220 and the front transparent plate 230, in order to strengthen the adhesion in-between.

The projection screen 200 fabricated as described above has a structure of FIG. 1. In particular, the light-absorbing material 240 is present in the surface side only of the waveguide array 220, so that the external light is absorbed, but the internal light in the waveguide is not absorbed, thereby minimizing the light loss of the internal light rays.

Although the present invention has been described with reference to several preferred embodiments, the description is illustrative of the invention and not to be construed as limiting the invention. Various modifications and variations may occur to those skilled in the art without departing from the scope and spirit of the invention, as defined by the appended claims.

INDUSTRIAL APPLICABILITY

As described above, the optical device of the invention can be applied to a projection TV, and a display for monitors, in particular, a screen for rear-projection TVs, and a screen for rear-projection systems. Also, it can be applied to optical parts of a display device or system such as a TFT-LCD, a PDP TV or a screen for CRT monitors, and also a display for commercial board or illumination.

The invention claimed is:

1. An optical device for a display including tapered waveguides disposed at intervals and a space for forming a light-absorbing region disposed between the waveguides, the tapered waveguide having an inclined face for reflecting and diffusing incident lights, the light-absorbing region being for absorbing external lights and reducing reflection, the light-absorbing region comprising:

(a) a first resin layer coated and cured along the inner wall face of the space, the first resin layer being formed of a resin having a refraction index different from the sidewall of the waveguide, preferably a lower refraction index relative to the sidewall of the waveguide, the first resin layer being free of blackish light-absorbing particles;

(b) blackish light-absorbing particles filled in the space outside the first resin layer and for absorbing external lights; and (c) a light-absorbing particle holder for fixing the light-absorbing particles.

2. The optical device according to claim 1, wherein the light-absorbing particle holder includes a second resin layer, which is mixed with the blackish light-absorbing particles, and filled and cured in the inside of the first resin layer, and the waveguide includes a cell-type waveguide.

3. The optical device according to claim 1, wherein the light-absorbing particle holder includes a coating layer formed in such a way that a transparent resin is coated and cured in the opening of the space filled with the light-absorbing particles.

4. The optical device according to claim 1, wherein the first resin layer is formed of a thermoplastic resin such as glycidyl metacrylate, vinyl silicon or the like.

5. The optical device according to claim 2, wherein the second resin layer and the coating layer are formed of a thermoplastic resin such as glycidyl metacrylate, vinyl silicon or the like.

6. The optical device according to claim 1, wherein the blackish light-absorbing particles includes blackish fine particles such as carbon black, iron oxide particles, or black spherical resin particles.

7. A method of fabricating an optical device for a display having a waveguide, by forming tapered waveguides on a thin plate so as to he disposed at intervals and have an inclined face for reflecting and diffusing incident lights, and forming a space for a light-absorbing region disposed between the waveguides and for absorbing external lights and reducing reflection, the method comprising steps of:
(a) coating a first resin on the inner wall face of the space, the first resin having a refraction index different from the waveguide, preferably a refraction index lower than that of the waveguide;
(b) curing the first resin to form a first resin layer on the inner wall of the space;
(c) filling blackish light-absorbing particles in the space outside the first resin layer; and
(d) fixing the filled light-absorbing particles inside the space.

8. The method according to claim 7, wherein the light-absorbing particles filling step includes a step of mixing the light-absorbing particles with a second resin and filling the mixture, and the light-absorbing particles fixing step includes a step of curing the second resin filled inside the space.

9. The method according to claim 7, wherein the light-absorbing particles filling step includes a step of filling the light-absorbing particles in the space without mixing with a resin, and the light-absorbing particles fixing step includes a step of coating and curing a transparent resin in the opening of the space filled with the light-absorbing particles.

10. An optical device for a display including tapered waveguides disposed at intervals and a space for forming a light-absorbing region disposed between the waveguides, the tapered waveguide having an inclined face for reflecting and diffusing incident lights, the light-absorbing region being for absorbing external lights and reducing reflection, the light-absorbing region comprising:
(a) blackish light-absorbing particles filled in the space without a resin and for absorbing external lights and reducing reflection; and
(b) a coating layer formed in such a way that a transparent resin is coated and cured in the opening of the space filled with the light-absorbing particles;
(c) wherein the blackish light-absorbing particles have a diameter larger than a half of a spacing between the larger faces of the waveguides and smaller than the spacing, and are stacked in three or more layers.

11. The optical device according to claim 10, wherein the coating layer is formed of a thermoplastic resin such as glycidyl metacrylate, vinyl silicon or the like.

12. The optical device according to claim 10, wherein the blackish light-absorbing particles include blackish fine particles such as carbon black, iron oxide particles, or black spherical resin particles.

13. The optical device according to claim 10, wherein the light-absorbing particles have a uniform size.

14. An optical device for a display including tapered waveguides disposed at intervals and a space for forming a light-absorbing region disposed between the waveguides, the tapered waveguide having an inclined face for reflecting and diffusing incident lights, the light-absorbing region being for absorbing external lights and reducing reflection, the light-absorbing region comprising: (a) a first resin filled and cured in the space, the first resin having a refraction index different from the waveguide, preferably a refraction index lower than that of the waveguide; and (b) blackish light-absorbing particles drawn and arranged near the surface of the first resin by a magnetic force and fixed in place by curing of the first resin.

15. The optical device according to claim 14, wherein the light-absorbing particles include fine particles such as iron oxide particles having a magnetic property.

16. The optical device according to claim 14, wherein the first resin includes a thermoplastic resin such as glycidyl metacrylate, vinyl silicon or the like.

17. A method of fabricating an optical device for a display having a waveguide, by forming tapered waveguides on a thin plate so as to be disposed at intervals and have an inclined face for reflecting and diffusing incident lights, and forming a space for a light-absorbing region disposed between the waveguides and for absorbing external lights and reducing reflection, the method comprising steps of:
(a) mixing blackish light-absorbing particles with a liquid-phase first resin, the light-absorbing particles having a magnetic property and the first resin having a refraction index different from the waveguide, preferably a refraction index smaller than that of the waveguide;
(b) filling in the space the first resin with the light-absorbing particles mixed therewith;
(c) exerting a magnetic force to the first resin filled in the space such that the light-absorbing particles are floated near the surface of the first resin; and
(d) curing the first resin filled in the space.

18. The method according to claim 17, wherein the mixing step includes a step of mixing iron oxide particles with the first resin.

* * * * *

UNITED STATES PATENT AND TRADEMARK OFFICE
CERTIFICATE OF CORRECTION

PATENT NO.         : 7,450,814 B2                                      Page 1 of 1
APPLICATION NO. : 11/568855
DATED              : November 11, 2008
INVENTOR(S)        : Gyuhwan Hwang, Youngbin Yu and Hyunsoo Lee It is certified that error appears in the above-identified patent and that said Letters Patent is hereby corrected as shown below:

Claim 7, column 15 should be corrected as follows:

Line 3: change -- he -- to "be"

Signed and Sealed this

Sixth Day of January, 2009

JON W. DUDAS
*Director of the United States Patent and Trademark Office*